Feb. 5, 1957  J. A. HJULIAN  2,780,239
TANK FILLING VALVE

Filed March 18, 1952  2 Sheets-Sheet 1

Inventor.
Julius A. Hjulian.
By Joseph O. Lang
Atty.

Feb. 5, 1957 J. A. HJULIAN 2,780,239
TANK FILLING VALVE
Filed March 18, 1952 2 Sheets-Sheet 2
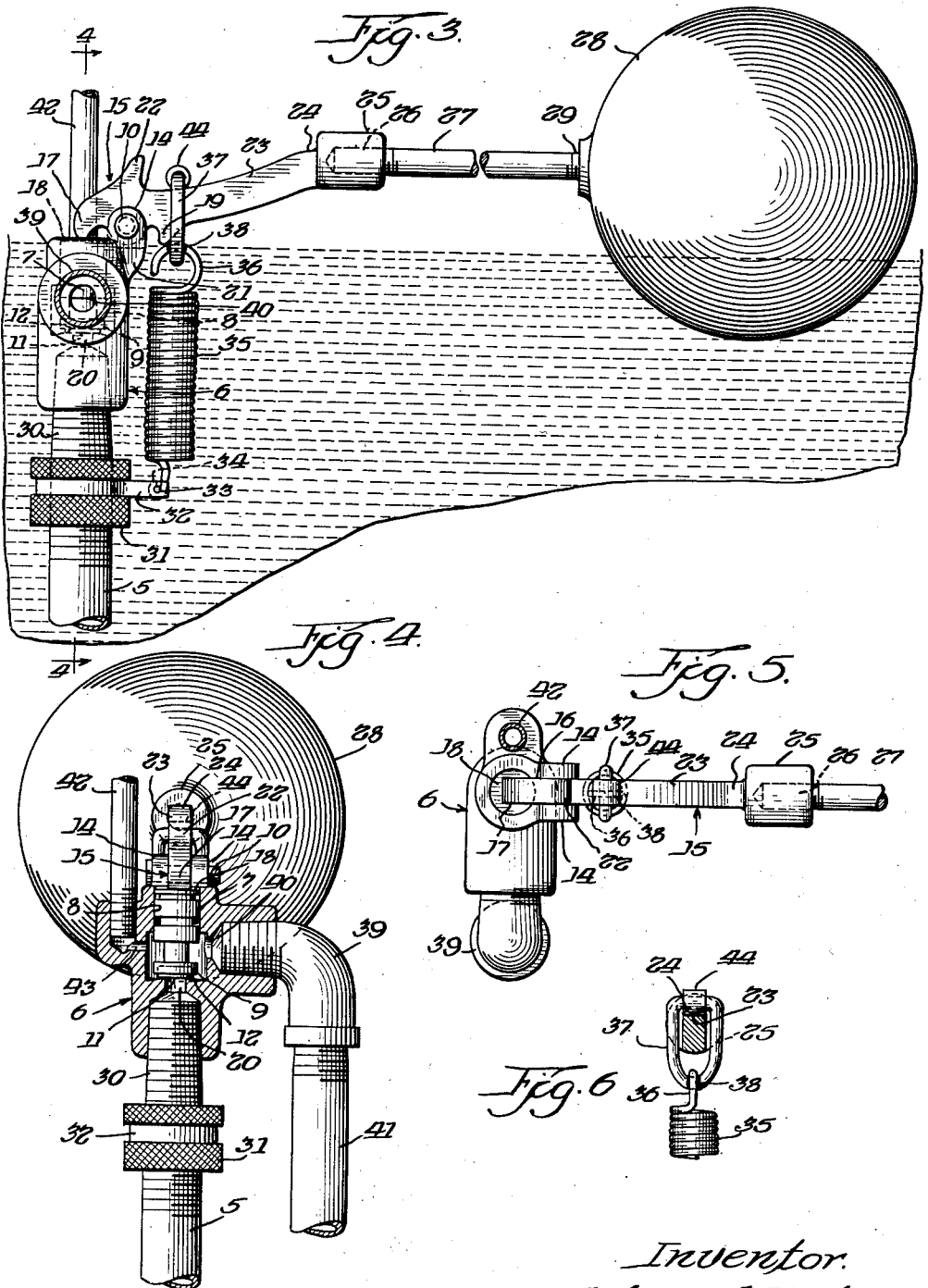
Inventor.
Julius A. Hjulian
By Joseph O. Lange
Atty.

United States Patent Office 2,780,239
Patented Feb. 5, 1957

2,780,239

TANK FILLING VALVE

Julius A. Hjulian, Palos Heights, Ill., assignor to Crane Co., Chicago, Ill., a corporation of Illinois Application March 18, 1952, Serial No. 277,201

6 Claims. (Cl. 137—416)

This invention relates broadly to a tank filling valve or ball cock structure, as of the type, for example, used in connection for filling closet tanks or similar plumbing devices. More especially, it is concerned with a tank filling valve in which one of the principal objects is to avoid the objectionable condition of wire drawing of the valve seats due to a slightly open or throttled condition immediately before the valve seats or actually closes.

Another important object is to provide a float valve actuated structure in which a snap action occurs in closing and thereby minimizes the danger of throttling with consequent seat cutting.

Another important object is to provide for a tank filling valve construction in which a faster tank fill is obtained than that previously accomplished in similar devices.

A further object is to provide for a structure insuring more quiet performance and possessing a greater assurance of longer valve life.

Other objects and advantages will become more readily apparent upon proceeding with the specification read in light of the accompanying drawings, in which:

Fig. 3 is a view similar to that described in connection with Fig. 2, but in which the valve shut-off has taken place.

Fig. 4 is a fragmentary sectional view taken on the line 4—4 of Fig. 3.

Fig. 5 is a fragmentary plan view.

Fig. 6 is a fragmentary sectional view of the link and roller assembly taken on the line 6—6 of Fig. 1.

Similar reference numerals refer to similar parts throughout the several views.

Figure 1:
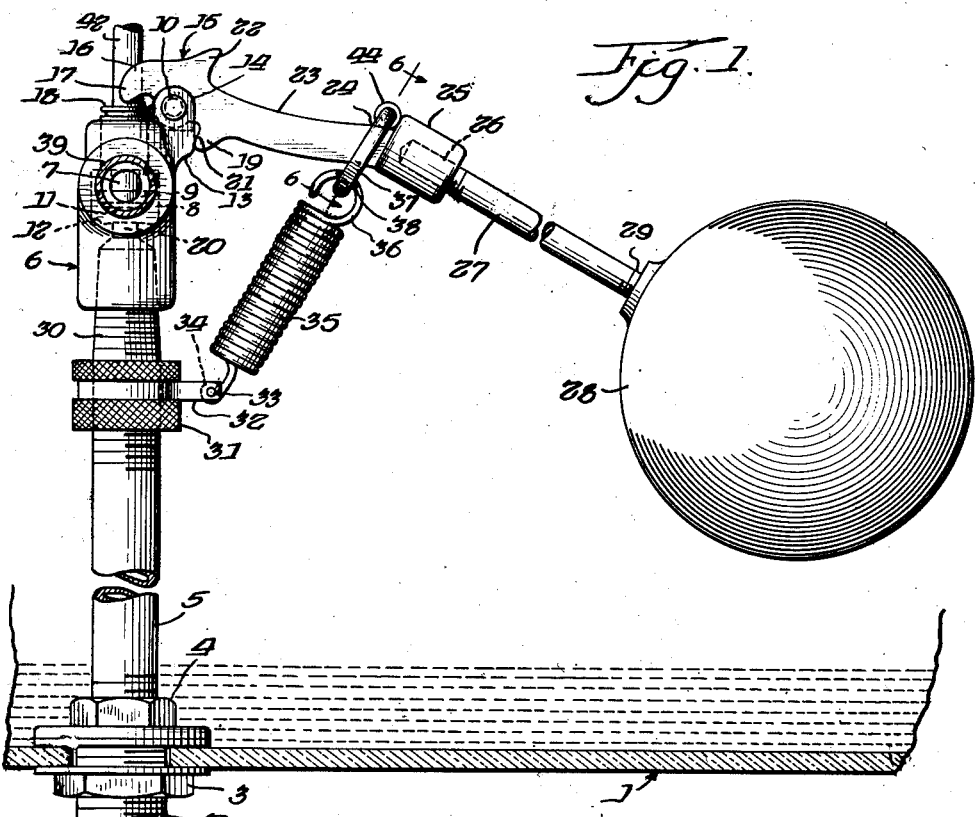
Fig. 1 is a fragmentary side exterior view of the novel assembly with the tank shown in substantially empty condition.

Referring now to Fig. 1, a closet tank or the like receptacle, generally designated 1, supports the usual pipe inlet 2, which latter member is held in place by means of the usual threaded locknuts and compression members 3 and 4 and having the inlet riser or supply pipe 5 having at its upper limit a valve body generally designated 6, which, as shown more clearly in the sectional view of Fig. 4, consists of the usual plunger type of closure member 7 slidably mounted for reciprocal movement within the valve chamber 8 for the customary opening and closing movement therewithin and having a lower closure or seat contacting portion 9 provided with a valve disc 11 to contact a valve seat 12 in the body 6, for closing predeterminately the valve inlet port 20.

At the upper exterior end of the valve body 6, an integral lug 13 is provided which has the upper bifurcated extensions or ears 14 between which the lever generally designated 15 is pivotally mounted for purposes hereinafter described by means of the pin 10. The float actuated lever 15 is of novel construction and consists of a forward or toe portion 16 having the lower contact or rounded point 17 normally bearing on the upper annular surface 18 of the closure or plunger member 7. As illustrated, at a location opposite to the toe 16, a heel portion 19 serves as a stop against the vertical surface 21 of the casing lug 13. It will be noted that at an upper portion of the lever 15 an extension 22 is provided on a surface portion of the said lever 15 for reasons hereinafter explained in detail. Extending therefrom below the stop 22 is the inclined surface 23, which may be slightly curved, as shown, or it may also be a straight or plane incline having at its opposite end limit a straight portion or shoulder 24 to which is integrally provided the hub 25, tapped as indicated at 26 to receive a ball float lever 27. To the latter member is attached the ball float 28 fixed thereto by means of the threads 29.

In predetermined location upon inlet riser pipe 5, a clamping or locknut 31 is provided consisting of upper and lower annular threaded portions and between which is provided the clamp 32 having a transversely extending pin 33 around which is coiled relatively snugly for rotational or pivotal movement the end portion 34 of the spring 35.

At its upper end limit, the coil spring 35 is provided with the extension preferably of hook form 36 and to which is attached a loop member or roller guide 37, preferably attached by means of brazing as indicated 38 for a fixed connection to the said spring. The detailed shape of the loop member is shown more clearly in the enlarged view of Fig. 6.

Figure 2:
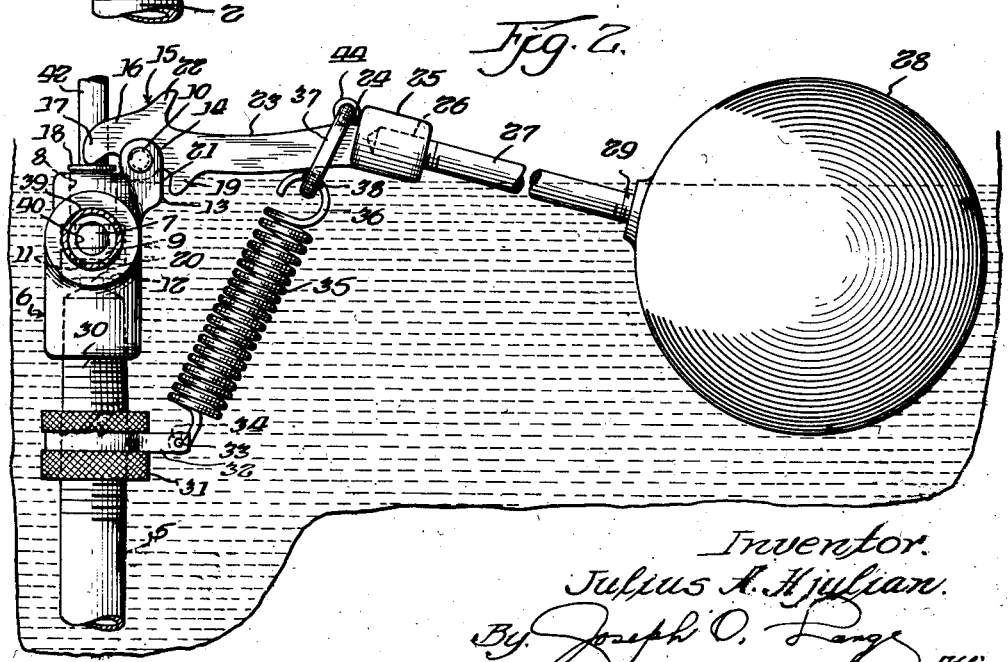
Fig. 2 is a view similar to that of Fig. 1, except that the tank is shown filled and in the position just before the valve shut-off takes place.

In obtaining a true appreciation of the operation of this device, let it be assumed that the tank 1 is empty or nearly so, so that the float member has dropped to its lowermost position in the tank as illustrated in Fig. 1. In this view, it will, of course, be apparent that the valve closure or disc 7, in view of the normal fluid pressure exerted within the inlet 20 (see Fig. 4), will be raised from its seat 12 by virtue of the pressure applied, and thus the valve will be normally filling and discharging outwardly from the casing 6 through the side outlet 39 and port 40 into the down spout filler member 41 to fill the tank in the usual manner, a conventional overflow portion being provided as indicated at 42 having a communication by means of port 43 with the valve chamber 8 in the customary manner. In the described position, the ball float 28 will rise correspondingly as the water level within the tank gradually moves upwardly. The ball and lever finally attain the position shown in Fig. 2, in which it will be noted that the ball float 28 is partially submerged due to the fact that the spring 35 is under tension. Thus, it prevents the combined levers 15 and 27 from rising to the full height normally permitted by the otherwise buoyant ball float 28. Accordingly, the valve 7 will remain off its seat 12 and continue to supply the tank with water through conduits 39 and 41 at substantially fully open capacity or rate until the ball float reaches the position shown in Fig. 2, at which instant, the loop member 37 preferably provided with the roller 44 will slide downwardly to the left from the shoulder 24 and move downwardly rapidly upon the inclined curved surface 23 to the position shown in Fig. 3, causing the valve closure 7 to be forced to its seat 12 by the lever toe 17. It will be understood that prior to the occurrence of the above described movement of the said loop member on the inclined surface, the roller 44 is predeterminately actuated. Because of upward movement of the float and lever and the change in the angularity of positioning of the spring 35 and the said loop member relative to the lever shoulder 24 concurrently with the increased tension of the spring, it (the roller) will be drawn to the left and over the edge of the said shoulder in a direction away from the hub 25 thereby to initiate the said downward movement of the roller on said incline. The design is such that it is preferable that the spring 35 at this position has no end slack or tension and thus when the tank again empties by means of a discharge valve (not shown), the roller 44 mounted on the loop member 37 will roll back from the stop 22 to the right to the position shown in Fig. 1, and ascending the shoulder 24 as shown in Fig. 2 to repeat the cycle of operation just described.

Thus, it will be clear that the spring 35 functions so as to restrain the movement of the roller and loop member down the incline 23 of the lever 15 and against the stop 22 until a predetermined water level in the tank has been reached. At such time, the snap action in quick valve closure referred to takes place. It should be understood that this rapid valve action avoids the usual simmering noises associated with filling a closet tank or the like, in which the valve is relatively closely throttled and timed just previous to actually closing tightly. It has also been found that in this construction in providing for a snap action in closing preserves the valve seat so as to prevent objectionable wire cutting or drawing of the valve seat or disc. In addition, it will be clear that the tank will fill more rapidly than normally due to the fact that the valve is substantially fully open until the instant at which the roller 44 and 37 moves away from the lever surface or shoulder 24 and the roller starts down the inclined surface 23 to bring it quickly against the lever stop 22 and cause the ball float 28 to reach again the fully raised position in the tank as shown in Fig. 3. Thus, it will be apparent that a relatively simple but very economical and effective structure has been devised for use in fields having many varied uses.

While only a single embodiment has been shown and described, it should, of course, be apparent that other exemplifications of the invention may be undertaken without departing from the spirit of the invention as defined in the appended claims.

I claim:

1. In a tank filling valve construction, a valve body, a reciprocally movable valve closure member therefor, the said body having an inlet and an outlet, a pivotal connection on the said body, the said closure member being positioned over said inlet and being movable to permit fluid communication between said inlet and said outlet, a lever mounted on the said valve body at the said pivotal connection to actuate the said closure member, a ball float on the lever for actuating said pivotal lever, slidable means movable on an inclined upper surface portion on the said lever, spring means attached to the inlet portion communicating with the said body at one end and connected to said slidable means at the other end, the slidable means moving to a predetermined end position on the lever upon pivotal movement of the lever downwardly, the said spring means being mounted to extend substantially transversely to the said pivotal lever, the said lever on an upper surface thereof at an end spaced oppositely from the pivotal connection to substantially define the range of movement of said slidable means having a shouldered slightly flattened upper surface portion beyond said inclined surface and forming a continuation thereof for receiving said slidable means upon occurrence of said lever pivotal movement downwardly, said spring means holding the said slidable means in position on said upper flattened surface portion of the said lever until the said ball float has reached a desired raised position in the tank, whereupon a predetermined tension is applied to the spring substantially endwise of the lever thereby to draw the slidable means away from said upper flattened surface portion for movement down said inclined surface to enable the lever to actuate said closure member and inhibit fluid communication between said inlet and outlet.

2. In a tank filling valve construction, a valve body, a reciprocally movable valve closure member therefor, the said body having an inlet and an outlet, a pivotal connection on the said body, the said closure member being positioned over the said inlet and being movable to permit fluid communication between said inlet and outlet, a lever mounted on the said valve body at the said pivotal connection and having a toe portion for holding the closure member in position, a ball float on the lever movable between upper and lower positions for actuating said lever to permit said movement of said closure member, combined roller and slidable means at a lower position of the float being engageable with an inclined upper surface of the said lever, the said lever on an upper surface thereof at an end removed from the lever pivotal connection having a shoulder surface portion forming a continuation of the inclined surface, the said roller upon downward movement of the pivotally connected lever being movable along an upper surface of the said lever to engage said shoulder surface portion of said lever, spring means pivotally attached to the said body at one end and being connected to said slidable means at the other, the said spring means holding the said slidable means and roller in predetermined position on the said shoulder surface portion of the lever until the said ball float has reached a desired raised position in the tank and the shoulder surface has been arcuately moved away from the spring attachment means on the body when increased tension is applied to the spring means whereby to draw the said roller and slidable means away from the said lever shoulder surface portion of the lever, the said spring means being inclined at an angle relative to the vertical plane of the valve and extending substantially transversely to the said lever, the said roller and slidable means under the tension of the said spring moving along the inclined upper surface to an opposite lever end having a second shoulder surface portion upon movement of the float to its lower position.

3. In a tank filling valve construction, a valve body, a valve closure member therefor, the said body having an inlet portion and an outlet and a pivotal connection, the said closure member being positioned over the said inlet portion and being reciprocally movable to permit fluid communication between said inlet portion and outlet, a lever mounted on the pivotal connection of the said valve body to actuate the said valve closure member, said lever at an end spaced from the pivotal connection having an upper shoulder surface portion with an inclined upper surface between said end and the lever pivotal connection of the body, a ball float on the lever for pivotally moving the said lever, a combined roller and guide means movable on said inclined upper surface of the said lever to predeterminately engage said upper shoulder surface portion and abut against an end thereof defining one end limit of the inclined surface, spring means attached at one end thereof to the said body and connected to said roller and guide means at the other end to hold the roller and guide means on said shoulder surface portion against the lever end abutment, the said spring means being pivotally mounted substantially transversely to the said lever and holding the said guide means and roller in said predetermined end abutting position relative to the inclined upper surface on the said lever when the said ball float has reached a desired position in the tank, the said lever shoulder providing that upon predetermined tension being applied to the said spring means upon said float reaching a predetermined raised position in the tank, the said roller and guide means are drawn from said lever shoulder position to move downwardly over the lever inclined surface, the said lever having an oppositely disposed stop means for the said roller and guide means effective at an end limit of the pivotal movement of the said float in the raised position to define the range of movement of the said roller and guide means on the said inclined upper surface of the lever.

4. In a tank filling valve construction, a valve body, a reciprocally movable valve closure member therefor, the said body having an inlet and an outlet and a pivotal connection, the said closure member being positioned over the said inlet and being movable to permit fluid communication between said inlet and outlet, a lever mounted on the pivotal connection of the said valve body to actuate the said valve closure member, the said lever having an upper inclined surface with stop portions at either end thereof, a ball float for actuating said pivotal lever, a substantially friction-free guide member mounted for movement along an inclined upper surface on the said lever to engage at one end a shoulder portion on the lever upon predeterminately lowered movement of the float, the latter shoulder portion including a flattened surface continuation of the lever inclined upper surface, resilient means attached to said body at one end thereof and being connected to the said guide member at the other, the said resilient means holding the said guide member in predetermined fixed position on the said flattened surface portion of the said lever until the said ball float has reached a desired raised position in the tank whereupon the flattened surface is moved farther from the resilient attachment means to the body and increased tension is applied by the said resilient means to draw the guide member away from the said lever shoulder portion and said flattened surface, the resilient means being substantially vertically disposed and devoid of any tension relative to the lever upon movement of the guide member down the inclined surface of the said lever.

5. In a tank filling valve construction, a valve body, a reciprocally movable valve closure member therefor, the said body having an inlet and an outlet and a pivotal connection, the said closure member being positioned over said inlet and being movable to permit fluid communication between said inlet and outlet, a lever mounted on the pivotal connection of the said valve body to actuate the said valve closure member, said lever on an upper edge portion thereof having an inclined surface, a ball float for actuating said pivotal lever, substantially friction-free guide means predeterminately movable on said upper inclined surface of the lever, spring means attached to the said body at one end thereof and at the other end being connected to the said guide means, the said spring means holding the said guide means in place on a shoulder continuation of the lever inclined surface through a plurality of consecutive pivotal positions of the said lever and until the said ball float has reached a desired level within the tank whereupon a certain tension is applied to the spring means and a force is applied to the guide means to withdraw the latter means from the lever shoulder continuation, thereby releasing the lever and causing the guide means to move down the lever inclined surface, the said spring means upon said latter movement of the guide means moving pivotally and assuming a substantially vertical position devoid of tension and simultaneously opening the valve to allow fluid flow therewithin to permit the ball float thereupon to rise and reach a predetermined buoyant position within the tank.

6. In a tank filling valve construction, a valve body, a reciprocally movable valve closure member therefor, the said body having an inlet and an outlet and a pivotal connection, the said closure member being positioned over said inlet and being movable to permit fluid communication between said inlet and said outlet, a lever mounted on the said valve body having on an upper surface oppositely disposed end shoulder portions and an inclined surface therebetween, the said lever being connected to the valve closure member, a float for actuating said lever, one of the shoulder portions being spaced remote from the lever connection to the body, a combined roller and guide member mounted for movement between said shoulder portions along the inclined surface on the said lever, spring means attached to the said body at one end thereof and being connected at the other end to the said guide member to hold the combined roller and guide predeterminately at the remotely spaced shoulder portion in the course of filling the tank, the latter shoulder portion constituting a continuation of the inclined surface on the lever, the said spring applying an increasing tension force on the said roller and guide when the latter member is in engagement with the said shoulder portion on the said lever as the lever moves pivotally upward until the said float has reached a desired level within the tank whereby tension is then exerted by the spring means transversely to draw the roller and guide away from the said lever remote shoulder portion, the said roller and guide member being actuated so as to be disengaged from said lever shoulder portion moving freely toward the said valve body along the lever inclined surface between said lever end shoulder portions.

References Cited in the file of this patent

UNITED STATES PATENTS

| | | |
|---|---|---|
| 1,379,529 | Combellick | May 24, 1921 |
| 1,699,182 | Dickey | Jan. 15, 1929 |
| 1,705,367 | Kennedy | Mar. 12, 1929 |
| 1,968,517 | Dixon | July 31, 1934 |
| 2,060,925 | Brosh et al. | Nov. 17, 1936 |
| 2,062,423 | Mingus | Dec. 1, 1936 |
| 2,172,647 | Widman | Sept. 12, 1939 |